July 28, 1959  B. M. THOMANN  2,896,327
SURVEYING APPARATUS
Filed April 17, 1957
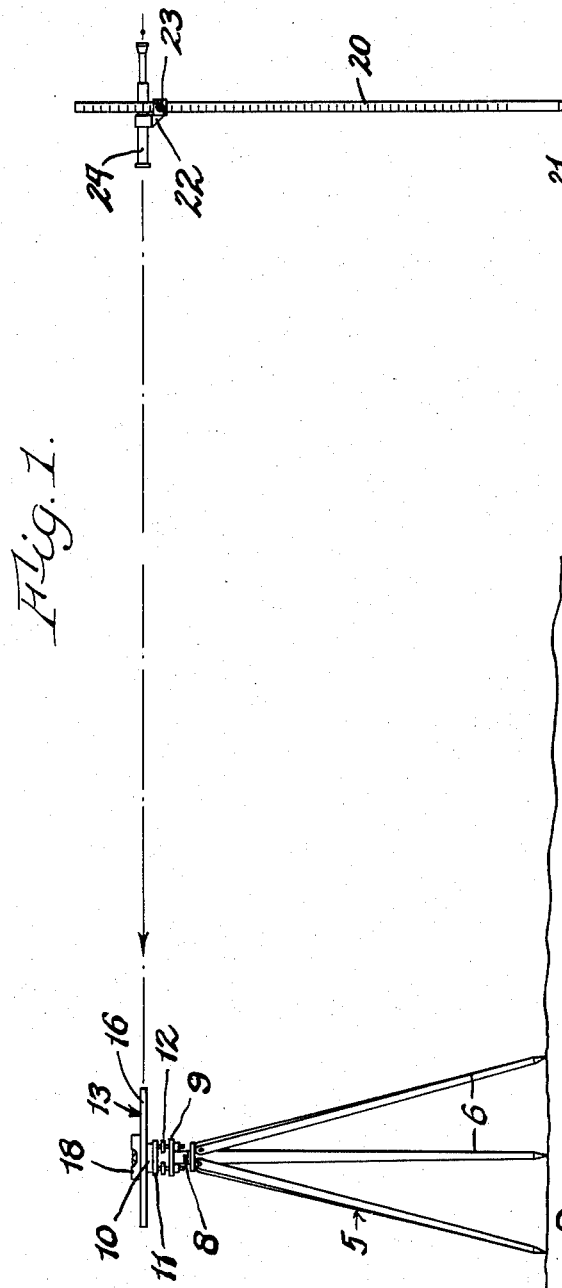
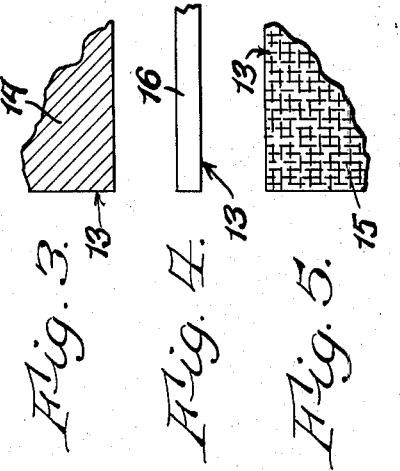
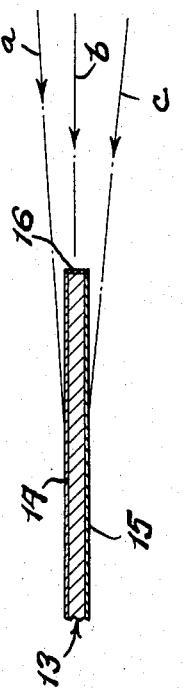
INVENTOR.
Bernard M. Thomann
BY
Popp and Sommer
Attorneys.

United States Patent Office 2,896,327
Patented July 28, 1959

2,896,327

SURVEYING APPARATUS

Bernard M. Thomann, Tonawanda, N.Y.

Application April 17, 1957, Serial No. 653,357

1 Claim. (Cl. 33—74)

This invention relates to surveying apparatus and more particularly to apparatus for use in grading large areas or making installations thereon, the apparatus being used to determine elevations with reference to a datum level at different points around the area being surveyed.

One of the principal objects of the present invention is to provide a very simple apparatus for so determining the elevations of different parts of a tract of land with reference to a datum level which can be operated by one having no skill at surveying.

Another important object of the present invention is to provide such apparatus which is accurate for a long distance so that the apparatus can be used in relatively large operations.

Another object of the invention is to provide such apparatus which can be easily and quickly set up to provide results having the required degree of accuracy.

Another object of the invention is to provide such apparatus which can be used by one man, this man setting up one part of the apparatus to provide the datum level, and then using another piece of the apparatus at different parts of the tract being surveyed to determine the difference in elevation between these different parts and the datum level.

Other objects and advantages of the invention will be apparent from the following description and drawings in which:

Fig. 1 is a side elevational view of apparatus embodying the present invention and showing the manner in which the elevations of the ground level at different places around a tract of land with reference to a datum level can be determined and plotted or marked.

Fig. 2 is an enlarged fragmentary elevational vertical section through the level board or table which is a part of one piece of the apparatus.

Fig. 3 is a fragmentary top plan view of this level board or table.

Fig. 4 is a fragmentary side elevational view thereof.

Fig. 5 is a fragmentary bottom plan view thereof.

In the accompanying drawings the number 5 represents a conventional tripod such as is commonly used by surveyors and comprising three legs 6 which can be of fixed or adjustable length and which support a collar 8 at the upper end of the tripod and which collar is shown as having an outwardly extending annular flange 9 at its upper end. A head 10 is mounted on this collar 8 through the medium of the usual loose ball (not shown) so that the head 10 can be inclined in any direction with reference to the collar 8. This head is shown as having an outwardly extending bottom flange 11 and between the flanges 9 and 11 are interposed a plurality of leveling screws 12.

On the head 10 is fixed a horizontal level board or table 13 which is shown as being square and of substantial horizontal extent in both directions to provide a table having broad horizontal dimensions and a band-like horizontally attenuated marginal edge of sufficient vertical thickness to be visible at a distance through a sight tube. The upper surface of this table 13 is shown as having a coat 14 of paint while its under surface is shown as having a coat 15 of paint and its edge is shown as having a coat 16 of paint. It is an important feature of the invention that the coat 16 of paint at the marginal edge of the table 13 be of a color contrasting with the coats 14 and 15 of paint. As shown in Figs. 3, 4 and 5, the edge paint 16 is shown as being white and while the coats 14, 15 of paint can be of the same color these coats of paint are shown as being of contrasting colors as shown in Figs. 3 and 5.

In the use of the present invention the level panel or table 13 is adjusted to be in the horizontal datum level or plane in all directions. This can be effected in any suitable manner as by the conventional level 18 shown and which can be placed upon the level table 13 in different positions and the leveling screws 12 adjusted until the level table 13 is truly level in all directions at the datum level.

The numeral 20 represents a conventional leveling rod having its lower end tipped, as indicated at 21, to rest upon the ground and being vertically graduated in any suitable manner. On this rod is mounted a sliding bracket 22 the height of which along the rod 20 can be adjusted by means of the set screw 23 shown. The bracket 22 is shown as carrying a horizontal sight tube 24 which can be in the form of a simple tube provided with cross hairs or the like or the sight tube can be in the form of a telescope with similar cross hairs for sighting a distant target.

In the use of the apparatus the conventional surveyor's tripod 5 is set up in the tract being surveyed and is adjusted so that the horizontal level table 13 is at the desired datum level. The bubble level 18 is then placed upon the level table 13 and it is brought so as to be truly level in all directions. This is effected by the leveling screws 12 which serve to adjust the head 10, and the level table 13 thereon, to any desired angular relation to the supporting collar 8.

After the level table 13 has so been adjusted to be level in all directions at the datum level, the person making the survey takes the leveling rod 20 and goes to the different places around the tract of land where any difference in elevation with reference to the datum level is to be determined. At each of such places he places the tip 21 of the leveling rod 20 on the ground and brings the rod to an upright position. He then adjusts the bracket 22 vertically along the rod 23 while sighting the band-like edge 16 of the level table 13 through the sight tube or telescope 24.

When the operator sights only the stripe 16 of edge paint on the level table 13 he knows that his sight tube or telescope 24 is level and also is at exactly the same level, i.e. the datum level, as the level table 13. Accordingly any difference in elevation between the ground levels can be determined by measuring the difference in the height of the level table 13 above the ground and comparing this difference between the distance of the sight tube or telescope 24 above the ground as determined by the graduations on the leveling rod. Accordingly this difference can be charted or marked on stakes (not shown) so that future operations upon the tract can be governed accordingly.

If the sight tube or telescope 24 is higher than the plane of the datum level of the level table 13, the sight tube or telescope 24 will not only be tipped slightly but also, in addition to the band 16 of edge paint on the level table, the person making the survey will also see the coat 14 of paint upon the upper surface of the table 13. Since the color of the layer 14 of paint on the broad upper surface of the level table is in distinct contrast to the band 16 of paint on the edge of the level table, the fact that the sight tube or telescope 24 is at an incorrect elevation will be instantly apparent. One the other hand, if this telescope or sight tube 24 is too low, the observer will see the coat 15 of paint on the underside of the level table 13. Again this coat 15 of paint is in distinct contrast to the narrow band 16 of paint on the edge of the table 13 and he will at once be apprised that his sight tube is not level with the table.

In the event that the user sees the color of either the top coat 14 of paint or lower coat 15 of paint, he continues to adjust the elevation of his sight tube or telescope 24 and also the vertical position of the leveling rod 20 until he sees only the color of the band 16 of paint on the edge of the level table 13. When this occurs, as previously indicated, the user of the apparatus knows that his sight tube or telescope 24 is at exactly the same elevation as the table 13 and hence he can readily compart and chart or stake this elevation above the ground level with the datum level of the level table 13 and determine the distance, above or below the datum level, of the sight tube or telescope 24.

From the foregoing it will be seen that one having little experience in surveying can easily set up the tripod 5 and the level table 13 so that the latter is truly level in all directions. Following this it will be seen that he can readily go to any place around the tract of land being surveyed and with the use of the leveling rod 20 can readily adjust the sight tube or telescope 24 so as to be exactly level with the level table 13 so that any difference between the datum level of the level table 13 and the elevation of the sight tube 24 on leveling rod 20 can accurately be determined.

I claim:

Apparatus for determining elevations with reference to a datum level, comprising a table having broad, parallel upper and lower surfaces and a band-like, horizontally attenuated marginal edge of sufficient vertical thickness to be visible at a distance through a sight tube, a coat of paint on said edge contrasting with the colors of said upper and lower surfaces, means arranged to support said table at said datum level with said upper and lower surfaces level in all directions, a vertical leveling rod at the elevation to be determined, a horizontal sight tube, and means adjustably supporting said horizontal sight tube for adjustment vertically along said leveling rod whereby when said coat of paint, free from said contrasting colors, is visible through said sight tube said sight tube is at said datum level.

References Cited in the file of this patent

UNITED STATES PATENTS

| | | |
|---|---|---|
| 302,609 | Wells | July 29, 1884 |
| 405,058 | Thompson | June 11, 1889 |
| 419,711 | Rogers | Jan. 21, 1890 |

FOREIGN PATENTS

| | | |
|---|---|---|
| 21,864 | Great Britain | Oct. 12, 1903 |